United States Patent [19]
Weinstein et al.

[11] Patent Number: 6,013,290
[45] Date of Patent: *Jan. 11, 2000

[54] ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION

[76] Inventors: Robert E. Weinstein, 177 Commonwealth Ave., Boston, Mass. 02115; Allan M. Weinstein, 9205 Pegasus Ct., Potomac, Md. 20854; David Schmier, 1822 Pandora Ave, #3, Los Angeles, Calif. 90025

[*] Notice: This patent is subject to a terminal disclaimer.

[21] Appl. No.: 08/997,406

[22] Filed: Dec. 23, 1997

Related U.S. Application Data

[63] Continuation-in-part of application No. 08/971,302, Nov. 17, 1997.

[51] Int. Cl.[7] ................................................. A23L 1/304
[52] U.S. Cl. ................ 426/74; 426/2; 426/108; 426/120; 426/590; 426/810; 424/439
[58] Field of Search ................ 426/2, 74, 108, 426/120, 810, 590; 424/439

[56] References Cited

U.S. PATENT DOCUMENTS

| | | | |
|---|---|---|---|
| 5,236,712 | 8/1993 | Fregly et al. | 424/679 |
| 5,403,921 | 4/1995 | Montner et al. | 426/810 |
| 5,587,190 | 12/1996 | Guezennec et al. | 426/590 |
| 5,780,094 | 7/1998 | King | 426/590 |
| 5,817,364 | 10/1998 | Olin | 426/590 |

OTHER PUBLICATIONS

B.J. Lyle et al., Hydration and Fluid Replacement, in *Sports Nutrition for the 90s*, 175 (J.R. Berning et al. eds, 1991).
A.C. Grandjean et al., Nutrition Knowledge and Practices of College Athletes, Med. Sci. Sports Exerc. 82 (1991).
J.E. Greenleaf, Problem: Thirst, Drinking Behavior, and Involuntary Dehydration, 24 Med. Sci. Sports Exerc. 645 (1992).
J.L. Ivy et al., Muscle Glycogen Synthesis after Exercise: Effect of Time of Carbohydrate Ingestion, 64 J. Applied Physiology 1480 (1988).

*Primary Examiner*—Helen Pratt
*Attorney, Agent, or Firm*—Morse & Altman

[57] ABSTRACT

An integrated package including two nutrient beverage formulations in discrete, sealed containers and instructions for use of the formulations in conjunction with a relatively short exercise session to enhance performance and reduce the adverse effects of the exercise. The formulations are compatibly designed for the needs of the different phases of exercise. The formulations are provided in either fully-constituted liquid form or as water-soluble concentrates. The formulations are combined in a unified package with indicia and instructions. The formulations include fluids, electrolytes, carbohydrates, and other optional agents including vitamin E, glycerol, alkaline salts, stimulants, creatine, specific amino acids, aspartates, phosphates, and pyruvate.

5 Claims, 1 Drawing Sheet

ASSEMBLAGE OF NUTRIENT BEVERAGES AND REGIMEN FOR ENHANCING CONVENIENCE, INSTRUCTION, AND COMPLIANCE WITH EXERCISE SUPPLEMENTATION

RELATED APPLICATION

The present application is a continuation-in-part application of application Ser. No. 08/971,302, dated Nov. 17, 1997 for ASSEMBLAGE OF NUTRIENT BEVERAGES AND REGIMEN FOR USE IN CONJUNCTION WITH EXERCISE in the names of Robert E. Weinstein, Allan M. Weinstein, and David Schmier.

BACKGROUND OF THE INVENTION

1. Field of the Invention

The present invention relates to physical fitness, more particularly, to nutrient beverage formulations for consumption before and after a short physical exercise session.

2. The Prior Art

It is well-known that, during exercise, the body loses fluids and nutrients that must be replenished. It is generally assumed that instinctive responses, such as hunger and thirst, are sufficient to prompt an individual to ingest the appropriate fluids and nutrients at appropriate times and in appropriate amount for exercise. However, this is not the case. It has been shown that thirst is an unreliable means by which to determine how much fluid to drink. Blunted thirst sensation is known to occur with exercise, and thirst can be quenched before the body completely rehydrates. If incomplete rehydration occurs regularly, fluid losses can accumulate over several days of exercise to produce hypohydration.

Further, it is generally assumed that expert formulation is unnecessary in view of common knowledge regarding the need for anticipating and replacing fluids during exercise. Surveys have disclosed, however, that information is lacking, even among serious athletes.

There are currently many beverages marketed for use with exercise, all of which consist of a single nutritional formulation. The use of a single formulation beverage fails to take into account the differing metabolic needs of the user during the periods before, during, and after exercise. Some athletes, in recognition of this problem, may use different beverage formulations during different phases of exercise. However, as indicated above, most athletes are poorly versed in how to properly supplement fluids and nutrients in conjunction with exercise.

There are packaged combinations of formulations available. However, these packaged combinations are not formulated to meet fluid and nutrient needs of different phases of exercise.

There is currently no product available which offers the advantages of a combination of nutrient beverage formulations that are compatibly formulated for coordinated use that addresses fluid, carbohydrate, or electrolyte equilibrium in the periods during and directly adjacent to exercise in order to reduce related metabolic and physiologic changes of exercise which can adversely effect performance and/or pose detrimental effects on health. Further, there is no product available to consumers which offers nutrient beverage formulations for use in conjunction with exercise which are conveniently packaged for use together.

SUMMARY OF THE INVENTION

An object of the present invention is to provide a person with a combination of nutrient beverage formulations and a program for their use prior to and after an exercise session lasting approximately one hour or less.

Another object is to provide a person with a combination of nutrient beverage formulations formulated to enhance performance during an exercise session and to reduce the detrimental physiological effects of the exercise after the session.

Yet another object is to provide a person with a combination of nutrient beverage formulations preformulated to work together in an optimal fashion by application of scientifically-derived data.

A further object is to provide a person with a combination of nutrient beverage formulations that is convenient and simple to use.

The present invention includes a regimen that comprises two different formulations containing fluids and nutrients and a program for use of the formulations before and after an exercise session. Each formulation is designed for the needs of a different phase of exercise and for compatibility with each other, something that is outside of the expertise of an ordinary user.

The preferred embodiment provides the user with containers of the formulations in fully-constituted liquid form. Alternatively, the formulations are provided in packets of water-soluble concentrates. The formulations are combined together in a unified package with indicia for identification of the different formulations and instructions for their use. The indicia and/or instructions are on the liquid container or concentrate packet and are optionally on the package and/or a booklet.

Various formulations and combinations of formulations are possible for use with the present invention. There are several goals in the design of the various formulations and program for use. One goal is to anticipate fluid loss by ingesting fluids during a period before exercise. Another is to prevent dehydration following exercise. Another goal is to maintain an appropriate level of electrolytes during exercise and to restore electrolytes after exercise. A third goal is to increase carbohydrates in the body prior to exercise so that more is available during exercise and to replace lost carbohydrate after exercise to increase the rate of recovery of muscle glycogen.

Other agents are optionally included in the formulations, including, for example, vitamin E to reduce free radical formation, glycerol to prevent dehydration, alkaline salts to counter the increased acidity caused by exercise that contributes to fatigue, stimulants to enhance performance either through psychological or physiological mechanisms, and creatine to induce high rates of adenosine triphosphate resynthesis. Other optional agents include specific amino acids, aspartates, phosphates, and pyruvate.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION

The present invention is an assemblage that comprises a combination of nutrient beverage formulations and a program for use of the formulations in conjunction with an exercise session. The formulations are devised for the metabolic and fluid considerations of different phases of exercise, something that is outside of the expertise of an ordinary user. The design of the formulations and program is based on considerations of fluid, electrolyte, carbohydrate, and other metabolic and physiologic needs attendant to exercise, dosage of each component in each formulation, cumulative dosage of components in the regimen, compatibility of the components in each formulation, and compatibility of the formulations with each other.

Figure 1:
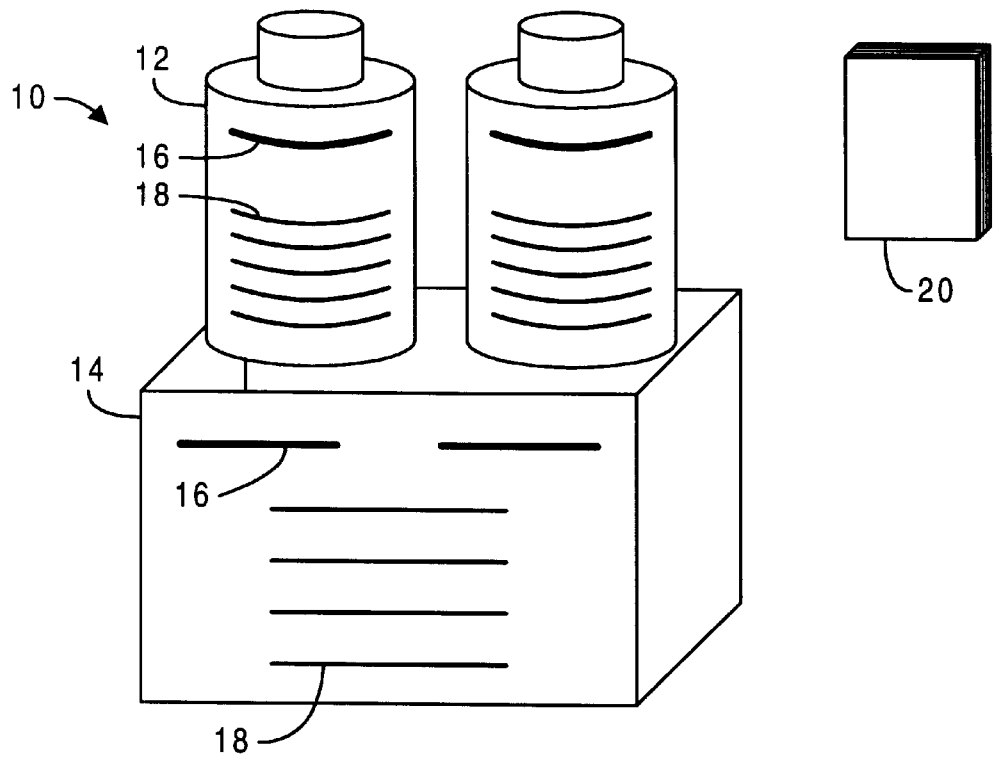
FIG. 1 shows an example preferred embodiment of the present invention.
Figure 2:
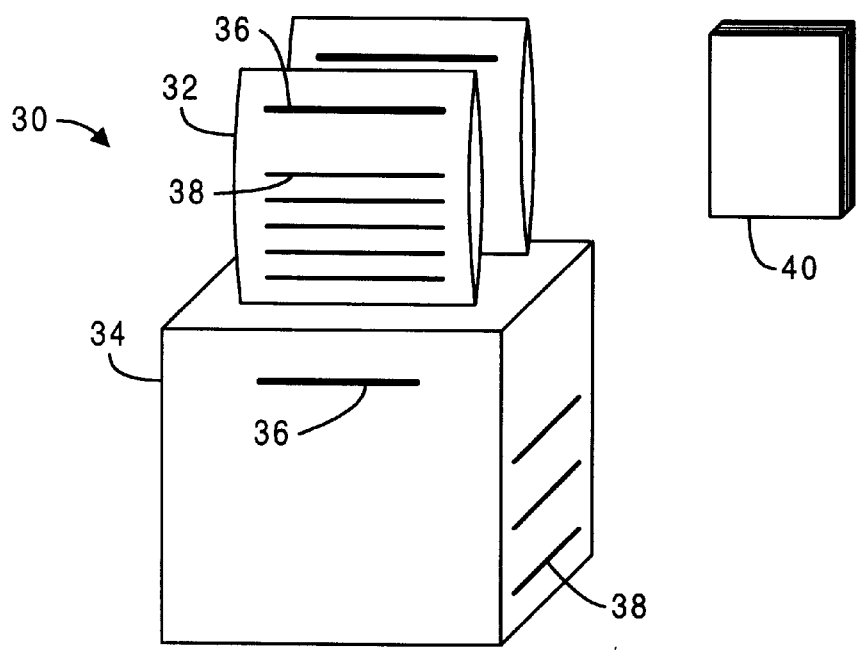
FIG. 2 shows an example of another preferred embodiment of the present invention.

In the preferred embodiment 10 of the present invention, shown in FIG. 1, the formulations are provided for the user in discrete containers 12 of fully-constituted liquid form so that they may be drunk directly. The particular type of container 12 that the liquid is supplied in, be it glass, plastic, waxed cardboard, etc., is not important to the present invention. In another preferred embodiment 30, shown in FIG. 2, the formulations are provided in discrete packets 32 of water-soluble concentrates, for example, powders, tablets, concentrated liquids, or liquid gels. Because of their relatively small size, these concentrates facilitate shipping and storage, but are less convenient for the user, because an additional step must be taken to dissolve the concentrates in water before the formulations are usable.

In the preferred embodiments 10, 30, the formulations are combined together in a unified package 14, 34 with indicia 16, 36 for identification of the different formulations and instructions 18, 38 for their use. The indicia 16, 36 and/or instructions 18, 38 are preferably on the liquid container 14 or concentrate packet 34 itself, and are optionally on the package 10, 30 and/or a booklet 20, 40 within the package 10, 30. Since the combination of formulations is fixed in a single package, there may be a variety of combinations depending upon the exercise program with which the present invention is used. Because all formulations are contained in a single package, it is more easily carried, which makes compliance with the program more likely.

The present invention addresses exercise-induced changes which can have an adverse effect on performance and/or a detrimental effect on health. Such changes include (1) decreased plasma volume, (2) increased body temperature, (3) plasma and muscle electrolyte alteration, and (4) decreased nutrient fuel availability to the working skeletal muscles.

(1) Plasma Volume and (2) Increased Body Temperature.

Plasma volume and body temperature regulation both relate to water replacement. Plasma volume decreases during exercise as a consequence of a net movement of water from the vascular compartment into the interstitial compartment and an increase in sweating. Only about one-third of chemical energy burned during exercise is converted into mechanical energy. The remainder of energy is converted into heat. Heat dissipation occurs primarily through sweating and about 1 liter of water per hour is typically lost in sweat. This may increase to 1.5 to 2.0 liters per hour with strenuous exercise, particularly in high ambient heat. As noted above, the typical athlete is not well informed about guidelines for water replacement to prevent dehydration, and the result of this lack of knowledge may be involuntary dehydration.

It is advisable for individuals to anticipate fluid loss prior to exercise and replace fluid losses after exercise. Hydrating prior to the onset of exercise in anticipation of fluid loss has been empirically shown to improve thermoregulation. Further, dilute carbohydrate beverages consumed within 15 minutes prior to exercise have been shown to enhance performance. Because exercise blunts the sensation of thirst, a deliberate effort should be made to fully replace body water after exercise. Athletes should replace every pound of body weight lost with 500 ml of fluid. Post exercise replacement is particularly desirable in athletes training daily, in whom a partial state of dehydration, or involuntary dehydration is known to occur. As noted below, post-exercise consumption of a beverage containing both carbohydrate and electrolyte speeds the recovery of plasma volume, plasma osmolality and muscle glycogen. Caffeine is best avoided during the post-exercise period because of its diuretic action.

(3) Electrolytes.

The sweating that accompanies exercise results in loss of both water and electrolytes. Sodium and chloride are the major electrolytes in sweat and plasma. The concentrations in sweat of $50.8 \pm 15.4$ millimoles (mM) sodium and $46.6 \pm 13.1$ mM chloride is approximately one-third the concentration in plasma. Because more water than electrolyte is lost, increased concentrations of these electrolytes can occur in the plasma. While the immediate need to replace water is therefore much greater than for electrolytes, drinking large amounts of plain water with very little sodium to compensate for sweat loss may later induce hyponatremia (dangerously low serum sodium) with accompanying symptoms of lethargy, drowsiness, muscle cramping, and mental confusion. It is preferable for subjects to rehydrate with water and sodium following exercise. Doing so restores more lost fluid than rehydrating with water alone.

(4) Nutrient Fuel Availability.

Glucose, derived from storage in muscle as glycogen, is the major fuel for most types of exercise. Anaerobic, high intensity exercise of short duration is fueled by glucose alone, as is longer exercise at or above 70% of aerobic capacity. With aerobic exercise of lesser intensity, after a 30–60 minute period for fat to become available to the muscles, approximately half of energy needs can be derived from fatty acids, the rest from glucose.

Carbohydrate stores in the body are limited. Critically low levels of muscle glycogen can occur with high intensity exercise and can limit performance. Muscle glycogen storage can be increased by consuming carbohydrates, and an increase in muscle glycogen can enhance performance capacity. The liver is also a glycogen storage site for exercise-accessible glucose.

Athletes who consume carbohydrates before exercise have the potential to significantly increase their carbohydrate stores and enhance their performance capacity. Glucose or glucose polymers ingested during the 5 minutes prior to exercise may result in a prolonged maintenance of blood glucose. Consumption of sugar just a few minutes prior to exercise confers the added advantage of a diminished insulin response during exercise and diminished risk of reactive hypoglycemia during exercise. Fructose has been suggested as an alternative to glucose by virtue of not provoking an insulin response. However, no differences in total glycogen use have been shown by studies comparing glucose and fructose. Glucose is clearly preferable in a significant number of individuals who experience cramping and gastric distress ingesting fructose.

It is known that carbohydrate replacement soon after exercise is advantageous for recovery of muscle glycogen. Delay of carbohydrate consumption for even two hours after exercise can reduce the rate of recovery by 50%. Glycogen resynthesis appears similar with glucose and sucrose supplementation after exercise, but 50% lower with fructose. High glycemic carbohydrates produce significantly greater glycogen storage than low glycemic foods.

Protein does not serve as a major source of energy during exercise. However, research shows that both endurance and strength training increase the need for protein in the diet. Exercise causes an increased utilization of several amino acids, particularly branched chain amino acids. The recommended dietary allowance (RDA) for protein is 0.8 g/kgbw per day. For strength training and promotion of lean body mass, a requirement of 1.4 to 1.8 g/kgbw/day has been determined. Notably, studies of dietary patterns of athletes have disclosed a considerable frequency of vegetarian-like eating habits and potential for inadequate availability of quality protein. For these reasons, amino acid, peptide, or protein supplementation are optionally included in a regimen, preferably to be included in the formulation to be ingested in the post-exercise period.

Additional Supplements and Ergogenic Aids.

Research demonstrating that some vitamins are pertinent to athletic performance suggests consideration of their inclusion in an exercise drink regimen. Thiamin requirement is higher in athletes consuming a high-calorie, high-carbohydrate diet. RDA for thiamin is 0.5 milligrams per 1000 calories consumed and no less than 1.0 mg/day for those consuming 2000 calories or less.

Vitamin E acts as an antioxidant, protecting the body from free radicals, substances that can damage cell membranes and tissues. Free radical exposure occurs both with environmental pollution (e.g. tobacco smoke, pesticides, radiation) and as a product of the body's own metabolism. Strenuous exercise may promote free radical production leading to tissue damage which may be interrupted by vitamin E. Supplementation with vitamin E has been shown to reduce free radical formation at rest and exercise, decrease muscle damage, and improve physical performance. These findings may extend to other vitamins with antioxidant properties, particularly vitamin C and beta-carotene. Vitamin supplementation are therefore optionally included in a regimen.

The use of glycerol prior to exercise has been used to prevent dehydration and enhance performance. Its major effect is mainly associated with plasma volume expansion. To a lesser degree, it may serve as a gluconeogenic substrate. It is rapidly absorbed, evenly distributed throughout body fluids, and is associated with a decrease in urine output, lower body temperature, and increased sweat rate compared to prior hydration with water alone. Glycerol may be particularly useful when exercising in the heat. A regimen for prolonged exercise containing glycerol might contain 1.2 g/kgbw in water prior to exercising and 1 g/kgbw every 6 hours.

Sodium bicarbonate (baking soda), sodium citrate and potassium citrate are examples of alkaline salts that possess buffering properties. Their use for exercise is predicated on increasing the alkaline reserve in the blood to counter the increasing acidity of exercise, which contributes to fatigue. Performance studies suggest that sodium-bicarbonate-loading prior to exercise may lower perception of exertion and improve performance in athletes utilizing the (anaerobic) lactic acid energy system.

Caffeine and other stimulants are theorized to enhance performance either through psychological or physiological mechanisms. Ingestion of caffeine before exercise may also increase lipolysis. Caffeine use is permitted by the International Olympic Committee (IOC) with an upper limit of 12 microgram/ml of urine tested, equating to an amount found in approximately 5 cups of coffee. A dose of 5 mg/kgbw would provide a stimulant effect and be within U.S. Olympic Committee and National Collegiate Athletic Association (NCAA) legal limits. Other stimulants, for example ephedrine, ephedrine containing teas and herb extracts, pseudoephedrine, and phenylpropanolamine might be employed in a formulation for before exercise. However use during competition would be cause for IOC or NCAA disqualification.

Creatine supplementation allows high rates of adenosine triphosphate (ATP) resynthesis to occur in muscle. In high intensity repetitive exercise, such as repeated sprints performed with short recovery period, creatine supplementation has been shown to increase performance. Creatine uptake is found to be enhanced when taken with high-glycemic-index carbohydrate, which increases insulin level, and would preferentially be accomplished in the post-exercise period. Similarly, supplementation with the leucine metabolite beta-hydroxy-beta-methly-butyrate has been shown to prevent exercise induced proteolysis and result in larger gains in muscle function associated with resistance training, and is optionally incorporated in a post-exercise formulation. Not excluded is the incorporation of other materials which are found, or may be found, to demonstrate positive effects on exercise, examples of which include specific amino acids, aspartates, phosphates, and pyruvate.

EXAMPLES

The type of nutritional materials which might be incorporated into formulations for coordinated use for before and after exercise beneficially include, but are not be limited to, simple and complex carbohydrates, fluids, electrolytes, amino acids, proteins, vitamins, minerals, stimulants, and other ergogenic aids. The following examples are meant to be illustrative of coordinated combinations of formulations to meet specific fluid and metabolic needs encountered in different time periods attendant to exercise, and are not intended to be an exhaustive.

Example I

The regimen of this example is intended for use with exercise of moderate intensity and duration (one hour or less). It consists entirely of fully-constituted liquid formulations. The goals of the regimen of this example include:

1. Prior to exercise: (a) insure adequate plasma volume before exercise; (b) provide a reservoir of fluid for exercise; (c) optimize blood glucose concentration; (d) provide a carbohydrate reservoir; and (e) provide a pre-exercise stimulant.

2. Following exercise: (a) stimulate glycogen replacement; (b) replace lost electrolytes; and (c) replace lost fluids.

Pre-exercise: 30 grams of carbohydrate and 275 mg of caffeine in 375 ml of water for consumption 15 minutes before exercise. The carbohydrate is preferably a combination of glucose and a less rapidly absorbed carbohydrate of low-to-medium glycemic index.

Post-exercise: 100 grams of glucose and 1160 mg of sodium chloride in 500 ml of water to be consumed shortly after exercise.

Example II

The regimen of this example is equivalent to the regimen of Example I, but consists entirely of concentrated formulations that are reconstituted in water-based liquid prior to consumption. Packets for this regimen may contain granulated powder, tablets, concentrated liquid, soluble gel, or other form that can be dissolved.

Pre-exercise: A concentrate comprising 30 grams of carbohydrate, 275 mg caffeine, and flavoring. The carbohydrate is preferably a combination of glucose and a less rapidly absorbed carbohydrate of low-to-medium glycemic index. The concentrate is dissolved in 375 ml of cold water and consumed 15 minutes before exercise.

Post-exercise: A concentrate comprising 100 grams of glucose and 1160 mg of sodium chloride. The concentrate is dissolved in 500 ml of water and is consumed shortly after exercise.

Example III

The regimen of this example is intended for use with intermittent, high-intensity, repetitive exercise of duration less than 1 hour. It consists entirely of fully-constituted liquid formulations. It accomplishes pre-exercise loading of alkaline salt (sodium bicarbonate) to counter the effects of lactic acid production on high-intensity muscle performance, and post-exercise loading of carbohydrate and creatine to augment ATP resynthesis and to augment muscle glycogen stores. The pre-exercise formulations anticipate fluid needs. Carbohydrate is loaded just prior to exercise to avoid insulin surge. Conversely, short acting carbohydrate is loaded after exercise to stimulate insulin output which augments creatine uptake by muscles. In view of pre-exercise sodium loading, sodium is not incorporated in formulations for use after exercise. Preferably, fructose is avoided in this regimen since both bicarbonate and fructose may be associated with stomach upset in some individuals.

Pre-exercise: 20 grams of sodium bicarbonate and 45 grams of glucose in 500 ml of water, 250 ml to be consumed 45 minutes prior to exercise and 250 ml to be consumed 15 minutes prior to exercise.

Post-exercise: 100 grams of glucose and 8 grams creatine monohydrate in 500 ml of water to be consumed shortly after exercise.

Thus it has been shown and described an assemblage of nutrient beverage formulations for use before and after exercise for enhancing performance during exercise and reducing adverse effects of exercise which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An exercise beverage kit comprising:
    (a) a first beverage having a volume of water of from about 300 milliliters to about 600 milliliters and a concentration of carbohydrate of about 9% or less;
    (b) a second beverage having a volume of water of from about 300 milliliters to about 600 milliliters and a concentration of carbohydrate of greater than about 16%;
    (c) indicia to distinguish said first and second beverages;
    (d) instructions which teach the use of said first and second beverages as a regimen in association with exercise such that said first beverage is instructed for ingestion prior to exercise having a duration of about one hour or less, and said second beverage is instructed for ingestion directly following said exercise; and
    (e) packaging unifying said first and said second beverages, indicia and, instructions.

2. The kit of claim 1 wherein said carbohydrate of said second beverage has a high glycemic index.

3. The kit of claim 1 wherein only said first beverage contains caffeine.

4. A method for preparing an exercise hydration and muscle glycogen replenishment kit comprising the steps of:
    (a) formulating a first beverage to have a volume of water of from about 300 milliliters to about 600 milliliters and a concentration of carbohydrate of less than about 9%;
    (b) formulating a second beverage to have a volume of water of from about 300 milliliters to about 600 milliliters and a concentration of carbohydrate of greater than about 20%;
    (c) devising indicia to distinguish said first and second beverages;
    (d) devising instructions to teach the use of said first and second beverages as a regimen in association with exercise such that said first beverage is instructed for ingestion prior to exercise having a duration of about one hour or less, and said second beverage is instructed for ingestion directly following said exercise; and
    (e) providing said fist and second beverages, indicia and, instructions in a unified package for a user.

5. A method for exercise hydration and muscle glycogen replenishment comprising the steps of:
    (a) obtaining an exercise beverage kit comprising a first beverage having a volume of water of from about 300 milliliters to about 600 milliliters and a concentration of carbohydrate of less than about 9%, a second beverage having a volume of water of from about 300 milliliters to about 600 milliliters and a concentration of carbohydrate of greater than about 20%, indicia to distinguish said first and second beverages, instructions which teach the use of said first and second beverages as a regimen in association with exercise having a duration of about one hour or less, and packaging unifying said first and second beverages, indicia, and instructions;
    (b) using said indicia to distinguish said beverages;
    (c) drinking said first beverage prior to said exercise, in accordance with said instructions; and
    (d) drinking said second beverage directly following said exercise, in accordance with said instructions.

* * * * *